United States Patent
Ashwin et al.

(10) Patent No.: US 7,437,346 B2
(45) Date of Patent: Oct. 14, 2008

(54) SYSTEMS AND METHODS FOR A LARGE OBJECT INFRASTRUCTURE IN A DATABASE SYSTEM

(75) Inventors: Shrinivas Ashwin, Sammamish, WA (US); Jose A. Blakeley, Redmond, WA (US); Peter Carlin, Seattle, WA (US); Jun Fang, Sammamish, WA (US); Ajay Kalhan, Redmond, WA (US); Christian Kleinerman, Bellevue, WA (US); Stefano Stefani, Seattle, WA (US); Aleksandras Surna, Redmond, WA (US); Honggang Zhang, Bellevue, WA (US)

(73) Assignee: Microsoft Corporation, Redmond, WA (US)

(*) Notice: Subject to any disclaimer, the term of this patent is extended or adjusted under 35 U.S.C. 154(b) by 282 days.

(21) Appl. No.: 10/776,664

(22) Filed: Feb. 10, 2004

(65) Prior Publication Data

US 2005/0187893 A1 Aug. 25, 2005

(51) Int. Cl.
*G06F 7/00* (2006.01)
(52) U.S. Cl. .............................. 707/1; 707/200; 707/6; 707/102
(58) Field of Classification Search ............... 707/103, 707/6, 102, 1
See application file for complete search history.

(56) References Cited

U.S. PATENT DOCUMENTS

| | | | | |
|---|---|---|---|---|
| 5,900,870 A | 5/1999 | Malone et al. | ............ | 345/333 |
| 6,047,291 A * | 4/2000 | Anderson et al. | ....... | 707/103 R |
| 6,108,004 A | 8/2000 | Medl | ......................... | 345/346 |
| 6,112,024 A | 8/2000 | Almond et al. | ............. | 395/703 |
| 6,199,195 B1 | 3/2001 | Goodwin et al. | ............. | 717/1 |
| 6,301,579 B1 * | 10/2001 | Becker | ...................... | 707/102 |
| 6,338,056 B1 | 1/2002 | Dessloch et al. | ............... | 707/2 |
| 6,370,541 B1 * | 4/2002 | Chou et al. | ............ | 707/103 X |
| 6,519,597 B1 | 2/2003 | Cheng et al. | .................. | 707/10 |
| 6,556,983 B1 | 4/2003 | Altschuler et al. | ............ | 706/55 |
| 6,578,046 B2 | 6/2003 | Chang et al. | ................. | 707/103 |
| 6,615,219 B1 * | 9/2003 | Bruso et al. | ................. | 707/102 |
| 6,735,598 B1 * | 5/2004 | Srivastava | .............. | 707/103 R |
| 6,772,178 B2 | 8/2004 | Mandal et al. | ............. | 707/204 |
| 2002/0091702 A1 | 7/2002 | Mullins | ..................... | 707/100 |
| 2002/0152422 A1 | 10/2002 | Sharma et al. | ............... | 714/13 |
| 2002/0198891 A1 | 12/2002 | Li et al. | ...................... | 707/102 |

OTHER PUBLICATIONS

Andrews, T. et al., "Combining Language and Database Advances in an Object-Oriented Development Environment", *OOPSLA Proceedings*, Oct. 4-8, 1987, 430-440.

(Continued)

*Primary Examiner*—Wilson Lee
*Assistant Examiner*—Binh V Ho
(74) *Attorney, Agent, or Firm*—Lee & Hayes, PLLC (57) ABSTRACT

Various embodiments of the present invention are direct to the utilization of Blob Handles (BHs) which are an internal representation of a large value. BHs are immutable and stateless references to a large data object. The structure of a BH contains enough information to return an ILockBytes interface in order to provide access to the corresponding large data block, and a BH can also return information regarding its own lifetime description. A BH can be completely described using (a) a pointer to the beginning of BH data and (b) the byte-length of the BH.

12 Claims, 4 Drawing Sheets

OTHER PUBLICATIONS

Beard, et al., "Multilevel and Graphical Views of Metadata", *Research and Technology Advances in Digital Libraries*, 1998, 256-265.

Beitner, N.D. et al., "Multimedia Support and Authoring in Microcosm: An Extended Model", *Department of Electronics and Computer Science*, University of Southampton, 12 pages.

Berg, C., How Do I Create Persistent Java Objects? *Dr. Dobb's Journal*, 1997, 22(4), 98-101.

Bhattacharya, S. et al., "Coordinating Backup/Recovery and Data Consistency Between Database and File Systems", *International Conference on Management of Data and Symposium on Principles of Database Systems, Proceedings of the the 2002 ACM SIGMOD International Conference on Management of Data*, 2002, 500-511.

Biliris, A., "The Performance of Three Database Storage Structures for Managing Large Objects", *ACM SIGMOD*, 1992, 276-285.

Booch, G. Benjamin/Cummings Publishing Co, "Object-Oriented Analysis and Design with Applications", 1994, 155, 156, 179-183.

Bracchi et al., "Binary Logical Associations in Data Modelling", *Modelling in Data Base Management Systems* G.M. Nijssen, (ed); North Holland Publishing Company. 1976, 125-147.

Buneman, P. et al., Inheritance and Persistence in Database Programming Languages, *ACM*, 1986, 4-15.

Chien, A.A., "Concurrent Aggregates (CA)—Design and Experience with a Concurrent Object—Oriented Language Based on Aggregates", *J. Parallel and Distributed Computing*, 1995, 25(2), 174-196.

Chryssostomidis, Chryssosiomos, et al. "Geometric Modeling Issues in Computer Aided Design of Marine Structures", *MTS Journal*, 22(2) pp. 15-33.

"Computervision Launches Design Automation Development Platform for Windows", *PR Newswire*, Financial News, Jan. 10, 1995.

D'Andrea, A. et al., "Unisql's Next Generation Object-Relational Database Management System", *ACM SIGMOD Record*, Sep. 1996, 25(2), 70-76.

Darby, C., Object Serialization in Java 1.1. Making Objects Persistent, *Web Techniques*, 1997, 2(9), 55, 58-59.

"Developer's Guide to Apple Data Detectors—For Version 1.0.2", © Apple Computer, Inc., 1997, 1-34.

Dietrich, Walter C., Jr., et al., "TGMS: An Object-Oriented System for Programming Geometry", *Software-Practice and Experience*, Oct. 1989, 19(10), 979-1013.

Dobashi, Y. et al, "Skylight for Interior Lighting Design", *Computer Graphics Forum*, 1994, 13(3), C85-C96.

Dorsch, Jeff, "Accel Signs with IBM to Buy Altium PCB Unit-Accel Technologies Acquires the Assests to Altium's P-CAD Business Unit", *EDA Licensing, Electronic New*, Jan. 16, 1995, 4 pages.

Fegaras, Leonidas, "Optimizing Object Queries Using an Effective Calculus", *ACM Transactions on Database Systems*, Dec. 2000, 25(4), 457-516.

Findler, R.B. et al., Contract Soundness for Object-Oriented Languages ACM Conference on Object-Oriented Programming Systems, Languages, and Applications, *OOPSLA*, 2001, 15 pages.

Foley et al., Computer Graphics: Principles and Practices, Second Edition, Addison-Wesley Publishing Company, 1990, Ch. 5 and 9, pp. 201-283.

Friis, A.-Christensen, et al."Geographic Data Modeling: Requirements and Research Issues in Geographic Data Modeling," Nov. 2001, *Proceedings of the 9th ACM International Symposium on Advances in Geographic Information Systems*, 2-8.

Fuh, Y-C. et al, "Implementation of SQL3 Structured Types with Inheritance and Value Substitutability", *Digital Symposium Collection*, 2000, Abstract only, 2 pages, www.acm.org/sigmod/disc/p_implementationoyostw.htm.

Garret, J.H., Jr. et al, "An Object Oriented Environment for Representing Building Design and Construction Data", *Advanced Construction Technology Center*, Jun. 1989, Document No. 89-37-04, 1-34.

Godoy Simões, M. et al, "A RISC-Microcontroller Based Photovoltaic System for Illumination Applications", *APEC 2000. Fifteenth Annual IEEE Applied Power Electronics Conference and Exposition*, Feb. 6-10, 2000, 2, 1151-1156.

Goscinski, A. "Distributed Operating Systems The Logical Design", *Addison-Wesley*, 1991, 306-313.

Harrison, C.J. et al., "Structure Editors: User-Defined Type Values and Type Inference", *IEEE*, 2000, 241-247.

Haverlock, K., "Object Serialization, Java, and C++", *Dr. Dobb's Journal*, 1998, 23(8), 32, 34, 36-37.

Hay, David C, "Data Model Patterns: Convention of Thought", (Dorset House Publishing, New York, NY 1996, 47-67, 235-259.

Hernandez, M.A. et al, "The Merge/Purge Problem for Large Databases, International Conference on Management of Data and Symposium on Principles of Database Systems", *Proceedings of the 1995 ACM SIGMOD International Conference on Management of Data*, 1995, 127-138.

Hsiao, H.I. et al., "DLFM: A Transactional Resource Manager", *SIGMOD, Proceedings of the 2000 ACM SIGMOD International Conference on Management of Data*, 2000, 518-528.

Kaneko, K, et al, "Design of 3D CG Data Model of Move Animation Database System", *Advanced Database Research and Development Series*, vol. 3, *Proceedings of the Second Far-East Workshop on Future Database Systems*, 1992, 364-372.

Kaneko, K. et al., Towards Dynamics Animation on Object-Oriented Animation Database System Move, *Advanced Database Research and Development Series*, vol. 4, *Database Systems for Advanced Applications* 1993, 3-10.

Katz, R.H., "Toward a Unified Framework for Version Modeling in Engineering Databases", *ACM Computing Surveys*, 1990, 22(4), 375-408.

Kawabe, S. et al, "A Framework for 3D Modeling Constraint-Based Description and Non-Manifold Geometric Modeling", *A Collection of Contributions based on Lectures Presented at the 2d Toyota Conference, Organization of Engineering Knowledge for Product Modelling in Computer Integrated Manufacturing*, Japan, Oct. 2-5, 1988, 325-357.

Kempfer, L., "CAD Jumps on Windows 3.1 Bandwagon", *Computer Aided Engineering*, 1993, 24-25.

Khan, L. et al, A Performance Evaluation of Storing XML Data in Relational Database Management Systems, *WIDM*, 2001, 31-38.

Khoshafian, S. et al, "Object Identify", *OOPSLA'86*, 1986, 21, 406-416.

King et al, "TriStarp—An Investigation into the Implementation and Exploitation of Binary Relational Storage Structures", *Proc. 8.sup.th BNCOD(British National Conference On Data Bases)*, pp. 64-84 (York 1990).

Krouse, J.K., "Geometric Models for CAD/CAM", *Machine Design*, Jul. 24, 1990, 99-105.

LeBlanc, Andrew R., et al, "Design Data Storage and Extraction Using Objects", *Concurrent Engineering: Research and Applications*, 1993, 1, 31-38.

Leontiev, Y. et al, "On Type Systems for Object-Oriented Database Programming Languages", *ACM Computing Surveys*, Dec. 2002, 34(4), 409-449.

Lim, J.B. et al, "Transaction Processing in Mobile, Heterogeneous Database Systems", *IEEE Trans. on Knowledge and Data Engineering*, 2002,14(6), 1330-1346.

Mariani, J. A., Oggetto: "An Object Oriented Database Layered on a Triple Store", *The Computer Journal*, 1992, 35(2),108-118.

McMahon, L.E, "SED-A Non-Interactive Text Editor", Bell Laboratories, Aug. 15, 1978, 10 pages.

"Mechanical Design Software (Buyers Guide)", *Computer-Aided Engineering*, Dec. 1993, 12(12), 32-36.

Melton, J. et al, "SQL and Management of External Data", *SIGMOD Record*, Mar. 2001, 30(1), 70-77.

Mitchell, W.J., "The Logic of Architecture", *Massachusetts Institute of Technology*, 1990, 139-143.

Navathe, S.B., "Evolution of Data Modeling for Databases," *Communications of the ACM*, Sep. 1992, 35(9), 112-123.

Nelson, M. et al, "Generic Support for Caching and Disconnected Operation", *4th Workshop on Workstation Operating Systems*, Oct. 1993, 61-65.

Nijssen, G.M. et al., "Conceptual Schema and Relational Database Design, A Fact Oriented Approach", *Department of Computer Science, University of Queensland, Prentice Hall*, 10-33, 42-43, 48-51, 156-170.

Oracle 9i SQL Reference, Release 2 (9.2), Mar. 2002, 13-89 to 13-90.

Orenstein, J, et al, "Query Processing in the Object Store Database System", *ACM SIGMOD International Conference on Management of Data*, Jun. 1992, 21(2),403-412.

Pachet, et al, "A Combinatorial Approach to Content-Based Music Selection", *Multimedia Computing and Systems*, Jun. 7, 1999, 457-462.

Papiani, M. et al, "A Distributed Scientific Data Archive Using the Web, XML and SQL/MED", *SIGMOD Record*, Sep. 1999, 28(3), 56-62.

Powell, M., "Object, References, Identifiers, and Equality White Paper", (Jul. 2, 1993), *OMG TC Document 93.7.5*, 1-24.

Prosise, J., "2-D Drafting: Why Pay More?", *PC Magazine: The Independent Guide to IBM-Standard Personal Computing*, 1993, 12(4), 255-289.

Reiner, A. et al., "Benefits of X-based Three-Tier Client/Server Model with ESRI Applications", *Virtual Solutions*, 1995, 9 pages.

Read, III, B.C., "Developing the Next Generation Cockpit Display System", *IEEE Aerospace and Electronics Systems Magazine*, 1996, 11(10), 25-28.

Rouse, N.E., "CAD Pioneers are Still Trailblazing", *Machine Design*, Oct. 22, 1987, 59(25),117-122.

Roussopoulos, N. et al., "Using Semantic Networks for Data Base Management", *Proceedings of the 1st Supplemental VLDB Conference*, 1975, 144-172.

Santos, J.L.T. et al., "Computer Aided Mechanical Engineering Design Environment for Concurrent Design Process", *Proceedings of the 1993 ITEC Workshop on Concurrent Engineering*, May 4-6, 1993, Simulation in Concurrent Engineering, 71-83.

Seshadri, P., "Enhanced Abstract Data Types in Object-Relational Databases", *The VLDB Journal, The International Journal on Very Large Databases*, 1998, 7, 130-140.

Simon, A.R., *Strategic Database Technology: Management for the Year 2000*, 1995, pp. 6-9, 14-17, 55-57, Morgan Kaufmann Publishers.

Sreenath, N., "A Hybrid Computation Environment for Multibody Simulation", *Mathematics and Computers in Simulation*, 1992, 121-140.

Singhal, A. et al., "DDB: An Object Design Data Manager for VLSI CAD", *Association for Computer Machinery*, 1993, 467-470.

Stevens, T., "Value in 3-D", *Industry Week*, Jan. 8, 1995, 45-46.

Stonebraker, M., "The Case for Partial Indexes", *SIGMOD Record*, 1989, 18(4), 4-9.

Strickland, T.M., "Intersection of Relational and Object", *Proceedings of the AM/FM International Conference XVII*, Mar. 14-17, 1994, 69-75.

Sutherland, J. et al., "The Hybrid Object-Relational Architecture (HORA), An Integration of Object-Oriented and Relational Technology", *Applied Computing: States of the Art and Practice*, 1993, 326-333.

Suzuki, H. et al., "Geometric Modeling for Modeling Products", *Proceedings of the Third international Conference on Engineering Graphics and Descriptive Geometry*, Jul. 11-16, 1988, Vienna Austria, 2, 237-243.

Sreekanth, U. et al., "A Specification Environment for Configuring a Discrete-Part Manufacturing System Simulation Infrastructure", *International Conference on Systems, Man and Cybernetics*, Oct. 17-20, 1993, 1, 349-354.

Taylor, R.H. et al., "An Integrated Robot System Architecture", *Proceedings of the IEEE*, Jul. 1983, 71(7), 842-856.

Varlamis I. et al., "Bridging XML-Schema and Relational Databases. A System for generating and Manipulating Relational Databases using Valid XML Documents", *DocEng' Ol*, Nov. 9-10, 2001.

Wilcox, J., "Object Databases-Object Methods in Distributed Computing", *Dr. Dobbs Journal*, Nov. 1994, 19(13), 26-34.

Watanabe, S., "Knowledge Integration for Architectrual Design", *Knowledge-Based Computer-Aided Architectural Design*, 1994, 123-146.

Waugh, A., "Specifying Metadata Standards for Metadata Tool Configuration", *Computer Networks and ISDN Systems*, 1998, 30, 23-32.

Wold, E. et al., "Content-Based Classification, Search, and Retrieval of Audio", *IEEE Multimedia, IEEE Computer Society*, 1996, 3, 27-36.

Yoshikawa, M. et al., "XRel: A Path-Based Approach to Storage and Retrieval of XML Documents Using Relational Databases", *ACM Transactional on Internet technology*, Aug. 2001, 1(1), 110-141.

Mallet, S. et al., "Myrtle: A Set-Oriented Meta-Interpreter Driven by a "Relational" Trace for Deductive Databases Debugging", *Lecture Notes in Computer Science*, 1999, 159-1581, 328-330.

Ottogalli, F.G. et al., "Visualisation of Distributed Applications for Performance Debugging", *Lecture Notes in Computer Science*, Jan. 2001, 2074, 831-840.

* cited by examiner

SYSTEMS AND METHODS FOR A LARGE OBJECT INFRASTRUCTURE IN A DATABASE SYSTEM

FIELD OF THE INVENTION

The present invention generally relates to the field of database systems and, more specifically, to systems and methods for providing a large object infrastructure that can be used for reimplementation of large object data types (text, ntext, and image), to support large user-defined types, as well as other new data types such as XML.

BACKGROUND OF THE INVENTION

In database storage platforms, including previously released versions of Microsoft's SQL Server, small value objects are copied without much concern for the overhead involved because such overhead costs are relatively nominal. However, for large-value objects, the overhead costs are much more significant and can negatively impact overall performance.

Heretofore large objects have been stored using large object (LOB) data types—text, ntext, and image data types—to overcome the size limitations of varchar, nvarchar, and varbinary types for values too large for these data types that are best suited to small data objects. However, there have been many restrictions on what has been allowed in the programming model with large objects, and the infrastructure led to an error prone implementation of large objects. For example, most string functions and operators are not allowed for LOBs, and there are also shortcomings with the text pointer functions in particular regard to insertions and deletions. (Text pointers are physical references used as row locators in earlier releases of SQL Server). Moreover, there is no efficient means for modifying one or more rows of a LOB at a time, and there is no support for LOB variables or copy functions for LOBs of any kind. These limitations, and others, result in LOBs being perceptibly different from other data types and therefore more difficult to use.

What is needed is a large object infrastructure where users/programmers can handle large values (data blocks) in the same way smaller values are handled, and thereby eliminate the user-perceptible differences in the handling of small and large values, in order to provide a single comprehensive programming model.

SUMMARY OF THE INVENTION

Various embodiments of the present invention are directed to systems and methods for providing an infrastructure that can be used for reimplementation of text, ntext, and image data types as new varchar(MAX), nvarchar(MAX), varbinary (MAX), and XML data types, as well as support large user-defined types (UDTs), and further enables support of additional new data types and programming model constructs. Several embodiments of the present invention are also directed to providing a data-handling infrastructure where users/programmers can handle large values (data objects) in the same way smaller values are handled, and thereby eliminate the difference between small and large values in order to provide a single comprehensive programming model.

These various embodiments utilize Blob Handles (BHs) which are an internal representation of a large value. BHs are immutable and stateless references to large data. The structure of a BH contains enough information to return an ILock-Bytes interface in order to provide access to the corresponding large data block, and a BH can also return information regarding its own lifetime description. These concepts and elements are described in more detail herein below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

The inventive subject matter is described with specificity to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the term "step" may be used herein to connote different elements of methods employed, the term should not be interpreted as implying any particular order among or between various steps herein disclosed unless and except when the order of individual steps is explicitly described.

Computer Environment

Figure 1:
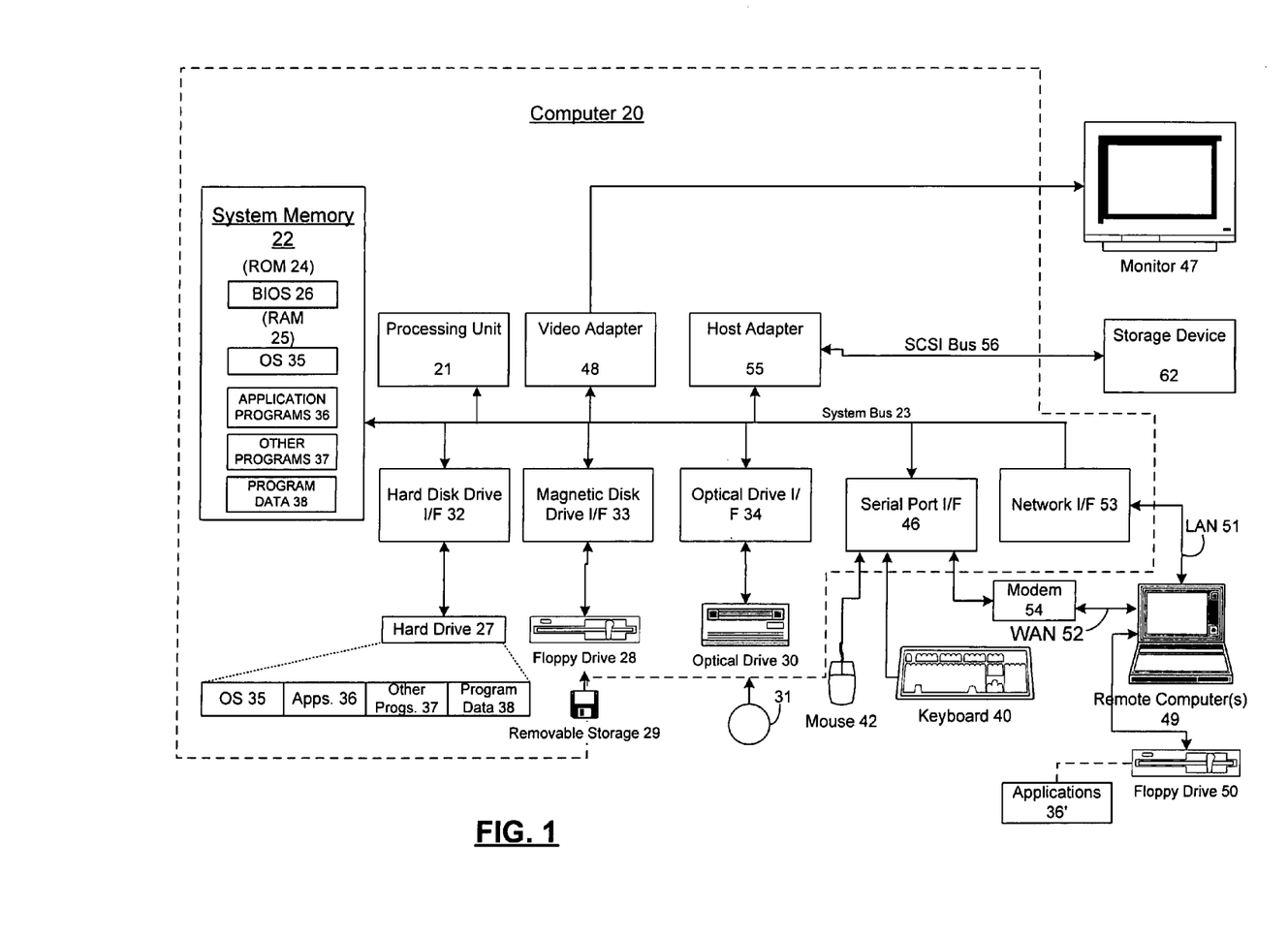
FIG. 1 is a block diagram representing a computer system in which aspects of the present invention may be incorporated.

Numerous embodiments of the present invention may execute on a computer. FIG. 1 and the following discussion is intended to provide a brief general description of a suitable computing environment in which the invention may be implemented. Although not required, the invention will be described in the general context of computer executable instructions, such as program modules, being executed by a computer, such as a client workstation or a server. Generally, program modules include routines, programs, objects, components, data structures and the like that perform particular tasks or implement particular abstract data types. Moreover, those skilled in the art will appreciate that the invention may be practiced with other computer system configurations, including hand held devices, multi processor systems, microprocessor based or programmable consumer electronics, network PCs, minicomputers, mainframe computers and the like. The invention may also be practiced in distributed computing environments where tasks are performed by remote processing devices that are linked through a communications network. In a distributed computing environment, program modules may be located in both local and remote memory storage devices.

As shown in FIG. 1, an exemplary general purpose computing system includes a conventional personal computer 20 or the like, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the personal computer 20, such as during start up, is stored in ROM 24. The personal computer 20 may further include a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer readable media provide non volatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs), read only memories (ROMs) and the like may also be used in the exemplary operating environment.

A number of program modules may be stored on the hard disk, magnetic disk 29, optical disk 31, ROM 24 or RAM 25, including an operating system 35, one or more application programs 36, other program modules 37 and program data 38. A user may enter commands and information into the personal computer 20 through input devices such as a keyboard 40 and pointing device 42. Other input devices (not shown) may include a microphone, joystick, game pad, satellite disk, scanner or the like. These and other input devices are often connected to the processing unit 21 through a serial port interface 46 that is coupled to the system bus, but may be connected by other interfaces, such as a parallel port, game port or universal serial bus (USB). A monitor 47 or other type of display device is also connected to the system bus 23 via an interface, such as a video adapter 48. In addition to the monitor 47, personal computers typically include other peripheral output devices (not shown), such as speakers and printers. The exemplary system of FIG. 1 also includes a host adapter 55, Small Computer System Interface (SCSI) bus 56, and an external storage device 62 connected to the SCSI bus 56.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise wide computer networks, intranets and the Internet.

When used in a LAN networking environment, the personal computer 20 is connected to the LAN 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used. Moreover, while it is envisioned that numerous embodiments of the present invention are particularly well-suited for computerized systems, nothing in this document is intended to limit the invention to such embodiments.

Networking Environment

Figure 2:
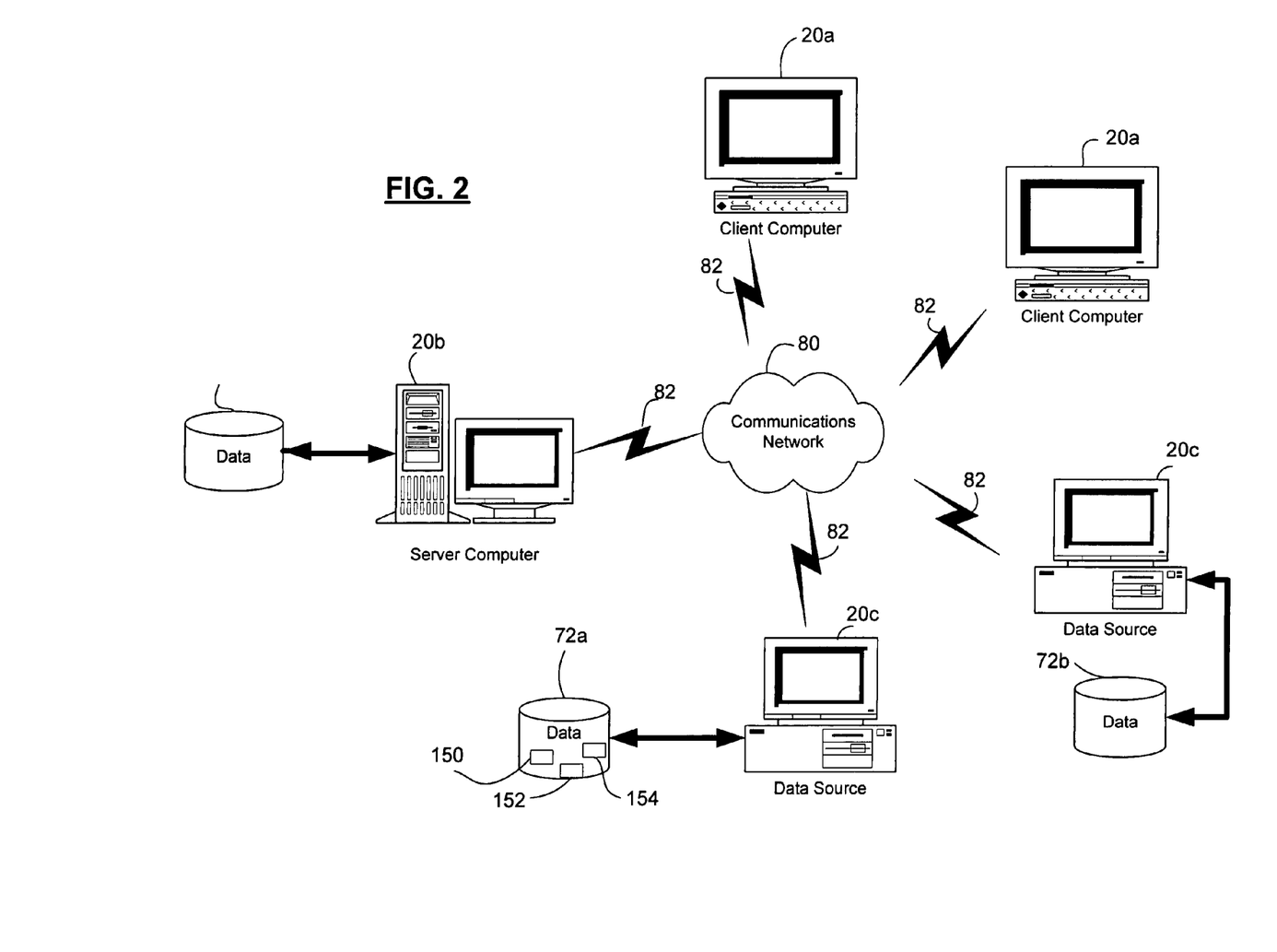
FIG. 2 is schematic diagram representing a network in which aspects of the present invention may be incorporated.

FIG. 2 illustrates an exemplary network environment in which the present invention may be employed. Of course, actual network and database environments can be arranged in a variety of configurations; however, the exemplary environment shown here provides a framework for understanding the type of environment in which the present invention operates.

The network may include client computers 20a, a server computer 20b, data source computers 20c, and databases 70, 72a, and 72b. The client computers 20a and the data source computers 20c are in electronic communication with the server computer 20b via communications network 80, e.g., an Intranet. Client computers 20a and data source computers 20c are connected to the communications network by way of communications interfaces 82. Communications interfaces 82 can be any one of the well-known communications interfaces such as Ethernet connections, modem connections, and so on.

Server computer 20b provides management of database 70 by way of database server system software, described more fully below. As such, server 20b acts as a storehouse of data from a variety of data sources and provides that data to a variety of data consumers.

In the example of FIG. 2, data sources are provided by data source computers 20c. Data source computers 20c communicate data to server computer 20b via communications network 80, which may be a LAN, WAN, Intranet, Internet, or the like. Data source computers 20c store data locally in databases 72a, 72b, which may be relational database servers, excel spreadsheets, files, or the like. For example, database 72a shows data stored in tables 150, 152, and 154. The data provided by data sources 20c is combined and stored in a large database such as a data warehouse maintained by server 20b.

Client computers 20a that desire to use the data stored by server computer 20b can access the database 70 via communications network 80. Client computers 20a request the data by way of SQL queries (e.g., update, insert, and delete) on the data stored in database 70.

BLOB Handles

Various embodiments of the present invention are directed to BLOB Handles (BHs). A BH (along with its interface, IBlobHandle), is an internal representation of an immutable and stateless reference to a large object (LOB) (hereinafter a "data block"). Using BHs, all instances of LOBs in a system (including BLOBs, which are binary large objects) can be consolidated into a single representation. In essence, a BH is a reference to locate a data block, wherein the BH completely describes the data block. The BH itself can be described with (a) a pointer to the beginning of BH data and (b) the byte-length of the BH.

For example, in C++, a BH supports method invocation like regular C++ objects using a pointer to the beginning of the buffer. The structure of a BH contains enough information to return an ILockBytes interface in order to provide access to the corresponding data block, and some BHs may support a "delete" method which destroys associated storage. BHs can also return information regarding their own lifetime descriptions. Furthermore, for small values the BH will be able to contain the value within itself and thereby bypass the retrieval of an ILockBytes interface and the virtual method calls to read from a separate data block.

Figure 3A:
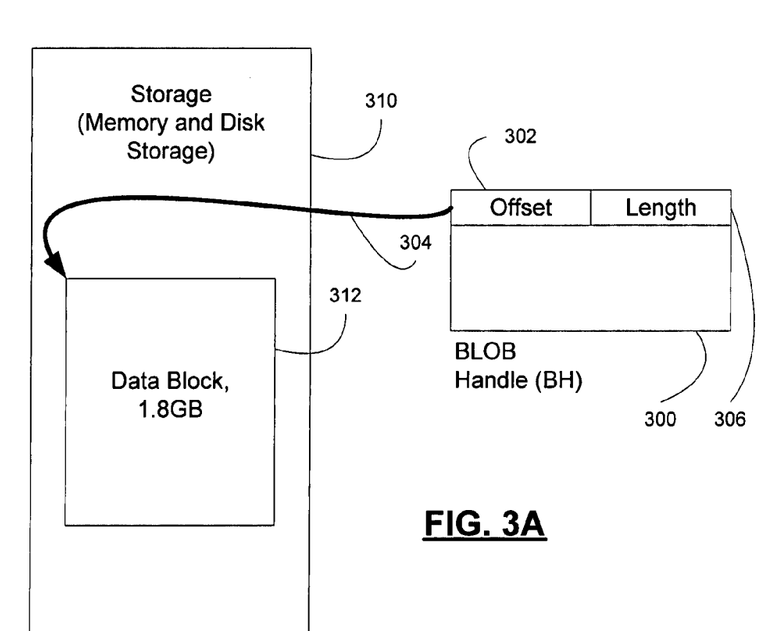
FIG. 3A is a block diagram illustrating the general components of a BLOB Handle (BH) in various embodiments of the present invention.

FIG. 3A is a block diagram illustrating the general components of a BH in various embodiments of the present invention. The BH 300 comprises (a) an offset 302 for a pointer 304 to the starting location of a corresponding data block 312 stored somewhere in memory or disk storage ("storage") 310, and (b) and a length 306 corresponding to the size of the data block 312 in storage 310. The BH further comprises a single-bit lifetime description (not shown).

Figure 3B:
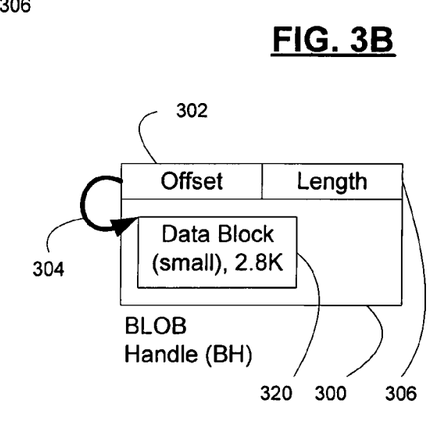
FIG. 3B is a block diagram illustrating a BH wherein a value is entirely contained within said BH according to various embodiments of the present invention.

FIG. 3B is a block diagram illustrating the same BH of FIG. 3A but wherein the offset 302 of said BH 300, instead of pointing to an externally-referenced LOB, points 304 to a smaller value 320 that is entirely contained within said BH 310.

BH Infrastructure

In the BH infrastructure, large value parameters are handled by using a copy of the BH (instead of a copy of the data block) to provide a copy on demand as an input parameters. This copied BH is passed as a pointer reference by using the BH aliasing mechanism provided by the BH infrastructure. However, if changes to the data block are necessary for one copy of the BH, then the large value is copied and the writing BH would point to this new copy alone; thus this copy functionality, by necessity, would generally occur for output parameters.

Figure 4A:
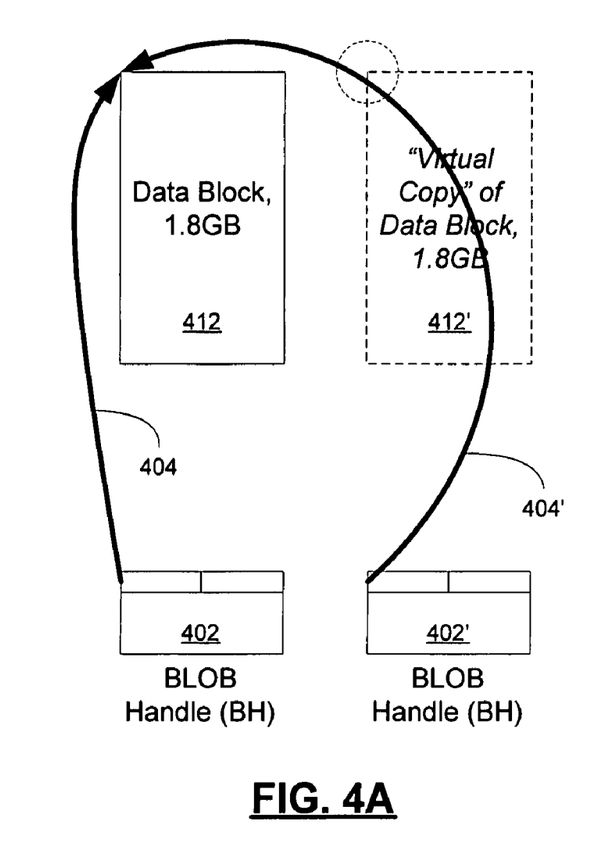
FIG. 4A is a block diagram illustrating an original BH and a second BH representing a virtual copy both pointing to the same data block for read-type operations.
Figure 4B:
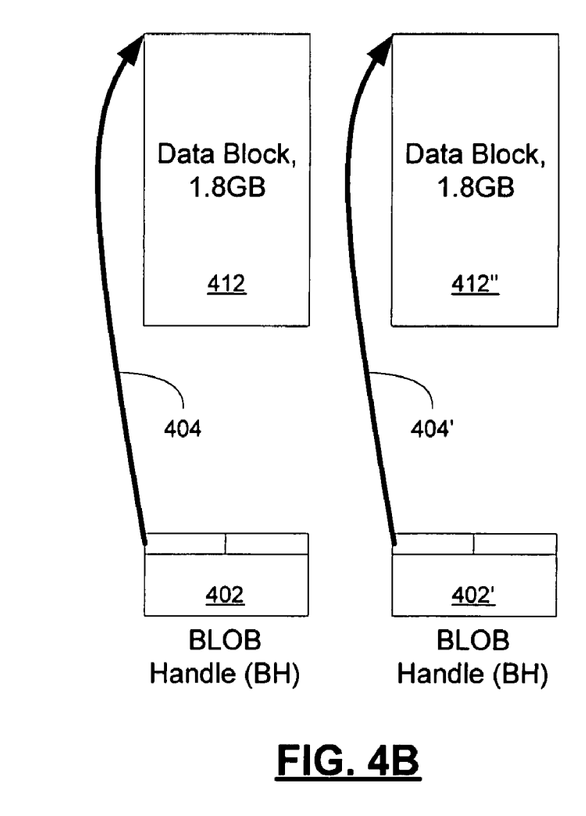
FIG. 4B is a block diagram of the BHs from FIG. 4A wherein a write operation is called by either BH and the second BH is pointed to a newly created copy of the data block.

FIG. 4A is a block diagram illustrating an original BH 402 pointing 404 to a data block 412 and the creation of a second BH 402' that represents a virtual copy 412' of the data block 412 but which in fact points 404' to the same data block 412. However, as illustrated in FIG. 4B, if the data in the "copy" represented by second BH 402' (or, conversely, if the data represented by BH 402) is to be changed by a write operation, then data block 412 is truly copied to a new data block 412" and the second BH 402' will point 404' to this second data block 412".

However, for various embodiments, the BH infrastructure may also support "partial updates" to data blocks—that is, the ability to change only a portion of a large value without incurring a full copy of the entire data value—to preclude some of the necessity for copying the entire data block. In operation, a partial update ascertains (a) a replacement value corresponding to a "chunk" of a data block (a chunk being a subpart of said data block), (b) an "offset" for the beginning of the chunk in the data block, and (c) the byte-length of the chunk to be replaced (which also corresponds to the byte-length of the replacement value). Logically, this approach simply replaces the byte-length number of bytes at the offset position of the data block (which essentially defines the metes and bounds of the subject chunk) with the aforementioned replacement value having an identical byte-length. In alternative embodiments, the replacement value need not be the same byte-length as the chunk being replaced, and smaller or larger values can be put into the chunk using various methods (e.g., pointer-based methods) known and appreciated by those of skill in the art. Moreover, either of these techniques can be used with the virtual copy concept described earlier herein and illustrated in FIGS. 4A and 4B.

Internally, partial updates are represented as a special form of column update (that can be mixed with other partial or regular updates) and, where possible, the change is pushed to disk storage modify only the specific portions of the B-tree required. However, in some cases, the system may choose to implement the partial update as a full copy for reasons of efficiency or robustness, and in other cases the update would not be performed partially but, instead, a full replacement is performed. The system implements partial updates as full copies (i.e. replacing the old value with the new) in the presence of updates that require a movement of the data row to a different physical location, for examples, updates to the partitioning or clustering key. The reason for this is that the movement of the row to a different location requires a full copy, and it is more efficient to complete the operation in one step. It should also be noted that the system will not reject as unfeasible update statements containing partial updates, but will instead choose to make a full copy implementation in the aforementioned cases.

Partial updates infrastructure also takes into account "Halloween protection" (i.e. when values being used as arguments in the UPDATE are also being updated themselves).

This partial update infrastructure represents a big advance over previous text pointer based technology. Given that partial updates are known operations to the query processor (QP), several features are now enabled that used to be restricted in the text pointer implementation, including but not limited to: index and indexed view maintenance, partitioning, replication, and constraint validation.

As part of the BH infrastructure for several embodiments of the present invention, the underlying storage infrastructure would also have the concept of a column in-row limit. This limit determines the size boundary at which a given value is chosen to be pushed off row as opposed to being kept in the main page. The smaller the in-row limit is, the sooner a column is pushed off row, and a larger limit has the opposite effect. As known and appreciated by those of skill in the art, this reflects a trade-off where small limits enable a larger number of rows to fit per page which, in turn, increases the row density and improves scan performance, but where the large value columns are not part of the scan. In this regard, the BH infrastructure allows an internally configurable in-row limit per type. Thus MAX V-Types can expose a given behavior based on a specific in-row limit, while UDTs or XML types can choose a different limit and achieve different density and scan performance characteristics more suitable to their size and structure.

BH Methods and API

For various embodiments of the present invention, the BH may support one or more of the following methods which are described in more detail later herein:

```
interface IBlobHandle
{
public:
    virtual const CBlobHandleProperties *PbhpGet( ) const = 0;
```

```
        // Returns blob handle properties.
    virtual ILockBytesSS *PilbGetILockBytes(_IN_
IlbGetFlags flags) const = 0;
        // Use regular Release to deallocate
ILockBytesSS.
        // ILockBytesSS may have limited support for
AddRef (e.q., may not return updated ref count).
    virtual void Delete( ) const = 0;
        // Allows to destroy storage associated with
temp handle (if any)
    virtual BOOL FGetPointer(_OUT_ _OPT_ LPCVOID *ppv,
_OUT_ _OPT_ ULONG *pcbLength) const = 0;
        // If TRUE then returns pointer + length to
read-only data(provided out parameters are not NULL).
        // If FALSE then in-memory pointer is not
available.
    };
```

Typical implementation of BH structure is inherited from an IBlobHandle interface with optional data appended in certain instances. Since a BH is self-contained and does not have embedded pointers to itself, no assumption are requited about the memory where it resides. Hence, to copy a BH, only a simple shallow copy is required. This allows the system to treat BHs the same way as regular columns are treated.

Although the BH can be used to locate a corresponding data block, it does not provide interfaces to manipulate the LOB data of the data block. Instead, for certain embodiments the PilbGetILockBytes method would be used to retrieve ILockBytesSS for data manipulation. The exact set of ILockBytesSS methods supported would vary on BH implementation but would typically falls into two categories: (i) read-only LOBs that only support read operations, such as a BH that represents data from a user table and which is typically read-only (with exceptions in the case of a partial update); and (ii) read-write LOBs that support both reading and updates to the data block, such as temporary BHs used to store temporary LOB values.

In certain embodiments, a delete method on BHs could be invoked in order to delete the LOB value associated with the BH. However, only some BHs would support this operation (e.g., temporary BHs) while others would not (e.g., a BH from user table). In any event, the delete operation would be non-failing, which is useful for handling cleanup to ensure that auto-destructors do not fail.

BHs in certain embodiments also support the FGetPointer method that, as an alternative to ILockBytesSS, could be used to return a pointer to and the length of the LOB data block, and thereby provide a faster means for accessing small read-only data. However, if the data block is not comprised of small read-only data, the method may return FALSE to indicate that the PilbGetILockBytes method should be used to access data instead.

For various embodiments, BH API methods except for Delete may throw exceptions.

BH Properties

In several embodiments the PbhpGet method returns CBlobHandleProperties which is an encapsulation of BH properties. Typically many BHs share common properties, and a comparison of properties via a pointer (CBlobHandleProperties*) is used to distinguish a BH's "flavor" (e.g., whether a BH points to data in a user table or instead points to a "custom" data block; BH Flavors are discussed in more detail later herein).

Several embodiments utilize a "lifetime" property for the length of time a BH reference is valid. For example, a BH may no longer be associated with an existing LOB value after some kinds of events. For certain embodiments, this property may simply be assigned one of two values, "query lifetime" or "row lifetime" (or other binary-equivalent designations). "Row lifetime" indicates the associated LOB values can be accessed only while a Query Execution (QE) iterator is processing a current row, and once the iterator proceeds to the next row the BH is no longer associated with the LOB value (and thus any further access is via the BH is prohibited). "Query lifetime," on the other hand, would indicate that the LOB values are valid until the end of the query (or, in other non-query cases, until the "BH Factory" is purged or shutdown, BH Factories being discussed in greater detail elsewhere herein).

BH Flavors

Several embodiments of the present invention comprise one or more "flavors" of BHs, said flavors comprising the following BH implementation variations:

A "table" BHs that points to a data block in a user table (and would typically have a "query lifetime").
  A "temporary" BH created using a BH Factory (discussed elsewhere herein) for temporary utilization.
  An "inlined" BH that, for sufficiently small data blocks, contains the data block entirely within the BH body. For this flavor, the ILockBytesSS interface is also inside the BH body so the PilbGetILockBytes method will be very fast and efficient.
  An "alias" BH that redirects method calls to another BH, which is particularly useful for certain operation such as converting a BH that is larger than a TEMPBLOBHANDLE_SIZE (a predefined size limit) to a BH that is less than or equal to a TEMPBLOBHANDLE_SIZE (as described in more detail herein below).
  A "wrapper" BH that redirects access to an existing ILockBytesSS object. This is particular useful when used to "cast" an existing ILockBytes object from another source (e.g., from an OLEDB) into a BH.
  An "orphan" BH that belongs to a specified filegroup and which can be linked to a user table at a later time. In operation, when a large value is streamed into the system, the large value can be copied directly into an orphan BH and, once the data is fully streamed, the BH is then made a part of the table being inserted to ("adopted") without need for additional copy. This kind of BH is thus used to minimize copies as well as improve performance of high performance bulk operations, such as BULK INSERT statement.

BH Maximum Size

For certain embodiments, assumptions about maximum buffer size are needed to contain the BH. For these embodiments, a QE would typically use the maximum size derived by a Query Optimizer (QO), although a very maximum BH size could also be defined as constant, e.g., const BLOBHANDLE_SIZE=8000. However, a "temporary" BH could have a limit based on the processor architecture, e.g., defined as const TEMPBLOBHANDLE_SIZE=0×40 for a 32-bit architecture. The main idea behind this approach is that most components would either access BHs by reference (and without allocating their own buffer) or use temporary BHs to spool the large value of a data block. Therefore it may be desirable to allocate small buffers (that is, of size TEMPBLOBHANDLE_SIZE) if the BH will be persisted. On the other hand, QE will typically use much larger BHs. However, the important consideration here is that almost any component can handle BHs of TEMPBLOBHANDLE_SIZE size, but if the BH is larger than this value and is visible to components outside Query Execution then it must only be accessed by its associated pointer. For example, if QE exposes large BHs to a Language Processing and Execution component (LPE), the LPE typically cannot copy the large BH into its own buffer and thus must use a pointer to the QE buffer.

BH Factories

A BH Factory (BHF) is an object that creates new BHs. In general, there may be no common interface supported by all BF Factories, but there is be a common interface supported by "Temporary BH Factories" (TBHFs) whereby temporary data blocks are used to store large data for processing by one or many components. In the latter case, an IBlobHandleFactory pointer is passed from one component to another for continued processing, and the TBHF has optimizations that make processing of data blocks representing smaller values (e.g., less than 8K) more efficient (as described above). There is also a special BHF that supports parallel access from multiple threads (described in more detail below).

The following method creates a BH using a TBHF:

```
// Function creates BH in specified buffer.
Buffer size is in/out parameter and returns created handle size.
    virtual void CreateNewBlobHandle(IBlobHandle
    *pbh, ULONG& cbBufferSize, CreateNewBlobHandleFlags
    flags) = 0;
```

In certain embodiments, this method creates a new BH associated with an "empty" LOB value. Data can then be written into this BH using ILockBytesSS, and additional methods to close and release the BH (ILockBytesSS::Close and ILockBytesSS::Release) could be used.

In general, BHFs can service multiple threads, though the specific thread that creates the BHF owns that particular BHF and is the only thread allowed to cleanup the BHF when the time comes. BHFs can also create BHs in groups by tagging the member BH so created with a given group identification number. This enables the BHF to provide services for releasing all BHs associated with a given group with a single operation.

Depending on the BHF, the BH created by a BH may be backed by disk or by memory. Initially (and preferably) BHFs do not have specific disk storage associated with them, but in general storage is created on demand on first use or through an explicit request. In this regard, various embodiments of the present invention utilize one or more types of BHFs, including but not limited to the following:

Fast BHFs: These BHFs create in-memory-only BHs which support smaller values by using memory backing instead of permanent disk storage. In general, the BH infrastructure would attempt to use a fast BHF when possible but would fall back on the slower disk backed storage if needed.

Disk Backed BHFs: These BHFs create BHs that are backed by disk storage and can hold values arbitrarily large (disk space permitting).

The MAX Specifier and MAX V-types

Using BHs, various embodiments of the present invention are also directed to the use of a MAX specifier for the varchar, nvarchar, and varbinary data types (together hereinafter the "V-types"). For example, table columns and TSQL variables may specify varchar(MAX), nvarchar(MAX), or varbinary (MAX) (together hereinafter the "MAX V-types") at definition/declaration time. In operation, MAX V-type columns and variables would use the "MAX" keyword as the specifier for the size of the type, and such values would be defined based on a size supportable by the system—e.g., varchar (MAX) !=varchar(<a valid number>)—although the largest literal that can be used at declaration to specify the max size for a varchar or varbinary continues to be 8000 and 4000 for an nvarchar. (Normally varchar or varbinary columns have a maximum size of 8000, but the MAX keyword qualifies columns whose maximum size is equivalent to the highest supportable by the system, using the BH infrastructure.)

In various alternative embodiments, one or more of the following operations and functionality would then be supported for the MAX V-types: comparison; TSQL variables; concatenation; certain string functions; full SELECT statement support, including DISTINCT, ORDER BY, GROUP BY, aggregates, joins, subqueries, and so forth; CHECK constraints, RULEs and DEFAULTs (were defaults greater than 8K are no longer silently truncated as happens today with LOBs); being part of indexed views definitons; visibility on inserted/deleted tables on AFTER triggers; and data type conversions; allowed in FFO cursors; FETCH . . . INTO . . . @variable; SET ANSI_PADDING; SET CONCAT_NULL_YIELDS_NULL; Full Text Search; and CREATE TYPE (to replace sp_addtype), among other things. However, because of the real and substantial size differences, for some embodiments of the present invention subtle differences between MAX V-types and V-types would continue to exist, including but not limited to the following: sql_variant still cannot contain MAX V-types; MAX V-type columns cannot be specified as a key column in an index (although they are allowed to be used as index subkeys); and MAX V-types columns cannot be used as partitioning key columns. It is however allowed to specify a prefix of the column as the key of the index or indexed view. This can allow the system to automatically consider the index in order to quickly retrieve the rows that qualify certain kinds of predicates involving the MAX V-type column. For example, a predicate in the form [Varchar(MAX) column]=Value, can be automatically split by the system into Prefix([Varchar(MAX) column])=Prefix (Value) AND [Varchar(MAX) column]=Value. The implied predicate over the prefix of the column can allow the usage of the index.

To ensure backward compatibility, when sending data downlevel to clients that do not support MAX V-types, the varchar(MAX), nvarchar(MAX), and varbinary(MAX) data types would be sent as LOB-type text, ntext, and image types respectively. Conversely, migration support for data receiving uplevel from clients in the form of LOB-type text, ntext, and image data would be transformed into the varchar(MAX), nvarchar(MAX), and varbinary(MAX) data types respectively.

CONCLUSION

The various systems, methods, and techniques described herein may be implemented with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computer will generally include a processor, a storage medium readable by the processor (including volatile and non-volatile memory and/or storage elements), at least one input device, and at least one output device. One or more programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, a video recorder or the like, the machine becomes an apparatus for practicing the invention. When implemented on a general-purpose processor, the program code combines with the processor to provide a unique apparatus that operates to perform the indexing functionality of the present invention.

While the present invention has been described in connection with the preferred embodiments of the various figures, it is to be understood that other similar embodiments may be used or modifications and additions may be made to the described embodiment for performing the same function of the present invention without deviating there from. For example, while exemplary embodiments of the invention are described in the context of digital devices emulating the functionality of personal computers, one skilled in the art will recognize that the present invention is not limited to such digital devices, as described in the present application may apply to any number of existing or emerging computing devices or environments, such as a gaming console, handheld computer, portable computer, etc. whether wired or wireless, and may be applied to any number of such computing devices connected via a communications network, and interacting across the network. Furthermore, it should be emphasized that a variety of computer platforms, including handheld device operating systems and other application specific hardware/software interface systems, are herein contemplated, especially as the number of wireless networked devices continues to proliferate. Therefore, the present invention should not be limited to any single embodiment, but rather construed in breadth and scope in accordance with the appended claims.

Finally, the disclosed embodiments described herein may be adapted for use in other processor architectures, computer-based systems, or system virtualizations, and such embodiments are expressly anticipated by the disclosures made herein and, thus, the present invention should not be limited to specific embodiments described herein but instead construed most broadly.

What is claimed:

1. A method for handling a large data object in a database system implemented in a computer system, said method comprising:
   creating a handling structure comprising:
   a reference to locate the large data object stored in the database system, the reference being configured to point to a small value data object within the handling structure itself provided that the small value data object is stored entirely within the handling structure;
   information to return an interface to provide access to the large data object in the database system; and
   a field having a value indicative of a length of time during which the handling structure is valid,
   wherein partial update of the large data object referenced by the handling structure is processed by replacing only a portion of the large data object without updating the large data object in its entirety to avoid substantial negative impact on overall performance of the database system.

2. The method of claim 1 wherein a data object having a type from a group of types consisting of text, ntext, and image data types is converted into a large data object with a corresponding handling structure.

3. The method of claim 1 wherein a data object having a type from a first group of types consisting of text, ntext, and image data type is converted into a data object having a type from a second group of types consisting of varchar(MAX), nvarchar(MAX), and varbinary(MAX) data types respectively, the varchar(MAX), nvarehar(MAX), and varbinary(MAX) data types each comprising a handling structure and a MAX corresponding to a predetermined maximum size value.

4. The method of claim 1 wherein said handling structure is created by a handling structure factory in response to a need for a handling structure.

5. A system for handling a large data object in a database system implemented in a computer system, said system comprising:
   a subsystem comprising a server computer for creating a handling structure Comprising:
   a reference to locate the large data object stored in the database system, the reference being configured to point to a small value data object within the handling structure itself provided that the small value data object is stored entirely within the handling structure;
   information to return an interface to provide access to the large data object in the database system; and
   a field having a value indicative of a length of time during which the handling structure is valid;
   wherein partial update of the large data object referenced by the handling structure is processed by replacing only a portion of the large data object without updating the large data object in its entirety to avoid substantial negative impact on overall performance of the database system.

6. The system of claim 5 wherein a data object having a type from a group of types consisting of text, ntext, and image data types is converted into a large data object with a corresponding handling structure.

7. The system of claim 5 wherein a data object having a type from a first group of types consisting of text, ntext, and image data type is converted into a data object having a type from a second group of types consisting of varchar(MAX), nvarchar(MAX), and varbinary(MAX) data types respectively, the varchar(MAX), nvarchar(MAX), and varbinary(MAX) data types each comprising a handling structure and a MAX corresponding to a predetermined maximum size value.

8. The system of claim 5 wherein said handling structure is created by a handling structure factory in response to a need for a handling structure.

9. A computer-readable storage medium comprising computer-readable instructions for handling a large data object in a database system implemented in a computer system, said computer-readable instructions causing the computer system to perform a method comprising:
   creating a handling structure comprising:
   a reference to locate the large data object stored in the database system, the reference being configured to point to a small value data object within the handling structure itself provided that the small value data object is stored entirely within the handling structure;

information to return an interface to provide access to the large data object in the database system; and a field having a value indicative of a length of time during which the handling structure is valid;

wherein partial update of the large data object referenced by the handling structure is processed by replacing only a portion of the large data object without updating the large data object in its entirety to avoid substantial negative impact on overall performance of the database system.

10. The computer-readable storage medium of claim 9, wherein the method further comprises:

converting into a large data object with a corresponding handling structure, a data object having a type from a group of types consisting of text, ntext, and image data types.

11. The computer-readable storage medium instructions of claim 9, wherein the method further comprises converting a data object into a large data object, wherein:

in an event that the data object is of a type, text, the data object is converted into a large data object of a type varchar(MAX);

in an event that the data object is of a type, ntext, the data object is converted into a large data object of a type nvarchar(MAX); and in an event that the data object is of a type, image, the data object is converted into a large data object of a type varbinary(MAX), wherein the varchar(MAX), nvarchar(MAX), and varbinary(MAX) data types each comprise a handling structure type and a MAX value corresponding to a predetermined maximum size value.

12. The computer-readable storage medium of claim 9, wherein said handling structure is created by a handling structure factory in response to a need for a handling structure.

* * * * *